United States Patent
Carey et al.

(10) Patent No.: US 8,439,793 B2
(45) Date of Patent: May 14, 2013

(54) MULTI-SPEED TRANSMISSION HAVING THREE PLANETARY GEAR SETS

(75) Inventors: Clinton E. Carey, Highland, MI (US); Scott H. Wittkopp, Ypsilanti, MI (US); Andrew W. Phillips, Rochester, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 12/841,656

(22) Filed: Jul. 22, 2010

(65) Prior Publication Data

US 2011/0034286 A1      Feb. 10, 2011

Related U.S. Application Data

(60) Provisional application No. 61/231,736, filed on Aug. 6, 2009.

(51) Int. Cl.
     *F16H 3/44*          (2006.01)
(52) U.S. Cl.
     USPC ......................................................... 475/282
(58) Field of Classification Search ........................ None
See application file for complete search history.

(56) References Cited

U.S. PATENT DOCUMENTS

| | | | | |
|---|---|---|---|---|
| 6,572,507 B1 * | 6/2003 | Korkmaz et al. | ............ | 475/276 |
| 6,648,790 B2 * | 11/2003 | Raghavan et al. | ............ | 475/280 |
| 6,736,749 B2 * | 5/2004 | Bucknor et al. | ............. | 475/275 |
| 6,780,138 B2 * | 8/2004 | Raghavan et al. | ............ | 475/276 |
| 7,131,924 B2 * | 11/2006 | Gumpoltsberger | ........... | 475/276 |
| 7,163,484 B2 * | 1/2007 | Klemen | ......................... | 475/276 |
| 7,204,780 B2 * | 4/2007 | Klemen | ......................... | 475/279 |
| 7,575,533 B2 * | 8/2009 | Gumpoltsberger | ........... | 475/280 |
| 7,704,181 B2 * | 4/2010 | Phillips et al. | ................ | 475/275 |
| 7,731,625 B2 * | 6/2010 | Phillips et al. | ................ | 475/284 |
| 7,841,960 B2 * | 11/2010 | Baldwin | ....................... | 475/280 |
| 7,854,679 B2 * | 12/2010 | Hart et al. | ...................... | 475/278 |
| 7,998,017 B2 * | 8/2011 | Wittkopp | ...................... | 475/284 |
| 8,029,402 B2 * | 10/2011 | Phillips et al. | ................ | 475/276 |
| 8,100,808 B2 * | 1/2012 | Wittkopp et al. | ............. | 475/276 |
| 8,113,984 B2 * | 2/2012 | Wittkopp et al. | ............. | 475/276 |
| 8,123,649 B2 * | 2/2012 | Wittkopp et al. | ............. | 475/280 |
| 8,152,681 B2 * | 4/2012 | Seo et al. | ....................... | 475/269 |
| 8,187,139 B2 * | 5/2012 | Baldwin | ....................... | 475/286 |
| 8,241,169 B2 * | 8/2012 | Phillips et al. | ................ | 475/282 |
| 2010/0216592 A1 * | 8/2010 | Wittkopp | ...................... | 475/284 |
| 2011/0034292 A1 * | 2/2011 | Carey et al. | .................... | 475/275 |
| 2012/0178569 A1 * | 7/2012 | Grochowski et al. | ............. | 475/5 |
| 2012/0178573 A1 * | 7/2012 | Hart et al. | ...................... | 475/149 |

\* cited by examiner

*Primary Examiner* — Dirk Wright

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

8 Claims, 9 Drawing Sheets

| GEAR STATE | GEAR RATIO | RATIO STEP | TORQUE TRANSMITTING ELEMENTS | | | |
|---|---|---|---|---|---|---|
| | | | 32 | 34 | 26 | 28 |
| REV | -2.879 | | X | | | X |
| N | | -0.87 | O | | | |
| 1ST | 3.307 | | X | X | | |
| 2ND | 2.092 | 1.58 | X | | X | |
| 3RD | 1.324 | 1.58 | | X | X | |
| 4TH | 1.000 | 1.32 | | | X | X |
| 5TH | 0.704 | 1.42 | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | |
|---|---|---|---|---|---|---|
| | | | 132 | 134 | 128 | 126 |
| REV | -2.000 | | X | | X | |
| N | | -0.60 | O | | | |
| 1ST | 3.350 | | X | X | | |
| 2ND | 2.154 | 1.56 | | X | X | |
| 3RD | 1.385 | 1.56 | | X | | X |
| 4TH | 1.000 | 1.38 | | | X | X |
| 5TH | 0.698 | 1.43 | X | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | |
|---|---|---|---|---|---|---|
| | | | 232 | 234 | 228 | 226 |
| REV | -1.423 | | | X | | X |
| N | | -0.42 | | O | | |
| 1ST | 3.366 | | X | X | | |
| 2ND | 2.219 | 1.52 | X | | | X |
| 3RD | 1.476 | 1.50 | X | | X | |
| 4TH | 1.000 | 1.48 | | | X | X |
| 5TH | 0.677 | 1.48 | X | X | | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | |
|---|---|---|---|---|---|---|
| | | | 332 | 334 | 328 | 326 |
| REV | -1.423 | | | X | | X |
| N | | -0.42 | | O | | |
| 1ST | 3.366 | | X | X | | |
| 2ND | 2.219 | 1.52 | X | | | X |
| 3RD | 1.476 | 1.50 | X | | X | |
| 4TH | 1.000 | 1.48 | | | X | X |
| 5TH | 0.677 | 1.48 | X | X | | |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||
|---|---|---|---|---|---|---|
| | | | 434 | 432 | 426 | 428 |
| REV | -4.154 | | X | | X | |
| N | | -0.99 | | | | |
| 1ST | 4.199 | | X | | | X |
| 2ND | 2.611 | 1.61 | X | X | | |
| 3RD | 1.618 | 1.61 | | X | | X |
| 4TH | 1.307 | 1.24 | | X | X | |
| 5TH | 1.000 | 1.31 | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS | | | |
|---|---|---|---|---|---|---|
| | | | 534 | 532 | 528 | 526 |
| REV | 1.640 | | | X | | X |
| N | | -0.39 | | | | |
| 1ST | 4.200 | | X | | | X |
| 2ND | 2.650 | 1.58 | | X | X | |
| 3RD | 1.903 | 1.39 | X | | X | |
| 4TH | 1.311 | 1.45 | X | X | | |
| 5TH | 1.000 | 1.31 | | | X | X |

X = ON - ENGAGED CARRYING TORQUE
O = ON - ENGAGED NOT CARRYING TORQUE

US 8,439,793 B2

MULTI-SPEED TRANSMISSION HAVING THREE PLANETARY GEAR SETS

CROSS-REFERENCE TO RELATED APPLICATIONS

This application claims priority to U.S. Provisional Application No. 61/231,736, filed on Aug. 6, 2009, which is hereby incorporated in its entirety herein by reference.

FIELD

The invention relates generally to a multiple speed transmission having a plurality of planetary gear sets and a plurality of torque transmitting devices and more particularly to a transmission having five or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In one embodiment, the transmission includes an input member, an output member, first, second and third planetary gear sets each having first, second and third members, a first interconnecting member continuously interconnecting the second member of the first planetary gear set with the third member of the third planetary gear set, a second interconnecting member continuously interconnecting the third member of the first planetary gear set with the second member of the second planetary gear set, and a third interconnecting member continuously interconnecting the first member of the second planetary gear set with the first member of the third planetary gear set. A first torque transmitting mechanism is selectively engageable to interconnect the input member and the third member of the second planetary gear set with the second member of the first planetary gear set and the third member of the third planetary gear set. A second torque transmitting mechanism is selectively engageable to interconnect the first member of the first planetary gear set with the second member of the first planetary gear set and the third member of the third planetary gear set. A third torque transmitting mechanism is selectively engageable to interconnect the first member of the first planetary gear set with a stationary member. A fourth torque transmitting mechanism is selectively engageable to interconnect the first member of the second planetary gear set and the first member of the third planetary gear set with the stationary member. The torque transmitting mechanisms are selectively engageable in combinations of at least two to establish at least five forward speed ratios and at least one reverse speed ratio between the input member and the output member.

In another embodiment, the transmission includes an input member, an output member, first, second and third planetary gear sets each having first, second and third members, a first interconnecting member continuously interconnecting the second member of the first planetary gear set with the second member of the second planetary gear set, a second interconnecting member continuously interconnecting the third member of the first planetary gear set with the second member of the third planetary gear set, and a third interconnecting member continuously interconnecting the first member of the second planetary gear set with the third member of the third planetary gear set. A first torque transmitting mechanism is selectively engageable to interconnect the second member of the first planetary gear set and the second member of the second planetary gear set with the first member of the third planetary gear set. A second torque transmitting mechanism is selectively engageable to interconnect the first member of the second planetary gear set and the third member of the third planetary gear set with the second member of the second planetary gear set and the second member of the first planetary gear set. A third torque transmitting mechanism is selectively engageable to interconnect the first member of the first planetary gear set with a stationary member. A fourth torque transmitting mechanism is selectively engageable to interconnect the first member of the third planetary gear set with the stationary member. The torque transmitting mechanisms are selectively engageable in combinations of at least two to establish at least five forward speed ratios and at least one reverse speed ratio between the input member and the output member.

In another embodiment, the transmission includes an input member, an output member, first, second and third planetary gear sets each having first, second and third members, a first interconnecting member continuously interconnecting the third member of the first planetary gear set with the second member of the third planetary gear set, a second interconnecting member continuously interconnecting the second member of the first planetary gear set with the second member of the second planetary gear set, and a third interconnecting member continuously interconnecting the first member of the second planetary gear set with the third member of the third planetary gear set. A first torque transmitting mechanism is selectively engageable to interconnect the second member of the first planetary gear set and the second member of the second planetary gear set with the first member of the third planetary gear set. A second torque transmitting mechanism is selectively engageable to interconnect the first member of the second planetary gear set and the third member of the third planetary gear set with the third member of the second planetary gear set and the output member. A third torque transmitting mechanism is selectively engageable to interconnect the first member of the first planetary gear set with a stationary member. A fourth torque transmitting mechanism is selectively engageable to interconnect the first member of the third planetary gear set with the stationary member. The torque transmitting mechanisms are selectively engageable in combinations of at least two to establish at least five forward speed ratios and at least one reverse speed ratio between the input member and the output member.

In another embodiment, the transmission includes an input member, an output member, first, second and third planetary gear sets each having first, second and third members, a first interconnecting member continuously interconnecting the second member of the first planetary gear set with the third member of the second planetary gear set, a second interconnecting member continuously interconnecting the third member of the first planetary gear set with the third member of the third planetary gear set, and a third interconnecting member continuously interconnecting the second member of the second planetary gear set with the second member of the third planetary gear set. A first torque transmitting mechanism is selectively engageable to interconnect the second member of the first planetary gear set and the third member of the second planetary gear set with the first member of the third planetary gear set. A second torque transmitting mechanism is selectively engageable to interconnect the first member of the second planetary gear set and the input member with the first member of the third planetary gear set. A third torque transmitting mechanism is selectively engageable to interconnect the first member of the first planetary gear set with a stationary member. A fourth torque transmitting mechanism is selectively engageable to interconnect the third member of the first planetary gear set and the third member of the third planetary gear set with the stationary member. The torque transmitting mechanisms are selectively engageable in combinations of at least two to establish at least five forward speed ratios and at least one reverse speed ratio between the input member and the output member.

In another embodiment, the transmission includes an input member, an output member, first, second and third planetary gear sets each having first, second and third members, a first interconnecting member continuously interconnecting the first member of the first planetary gear set with the first member of the third planetary gear set, a second interconnecting member continuously interconnecting the second member of the first planetary gear set with the second member of the second planetary gear set, and a third interconnecting member continuously interconnecting the first member of the second planetary gear set with the third member of the third planetary gear set. A first torque transmitting mechanism is selectively engageable to interconnect the second member of the first planetary gear set and the second member of the second planetary gear set with the second member of the third planetary gear set and the output member. A second torque transmitting mechanism is selectively engageable to interconnect the second member of the first planetary gear set and the second member of the second planetary gear set with the first member of the second planetary gear set and the third member of the third planetary gear set. A third torque transmitting mechanism is selectively engageable to interconnect the third member of the second planetary gear set with a stationary member. A fourth torque transmitting mechanism is selectively engageable to interconnect the third member of the first planetary gear set with the stationary member. The torque transmitting mechanisms are selectively engageable in combinations of at least two to establish at least five forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the five speed automatic transmission of the present invention have an arrangement of permanent mechanical connections between the elements of the three planetary gear sets. A second component or element of a first planetary gear set is permanently coupled to a third component or element of the second planetary gear set. A third component or element of the first planetary gear set is permanently coupled to third component or element of the third planetary gear set. A second component or element of a second planetary gear set is permanently coupled to second component or element of the third planetary gear.

Figure 1:
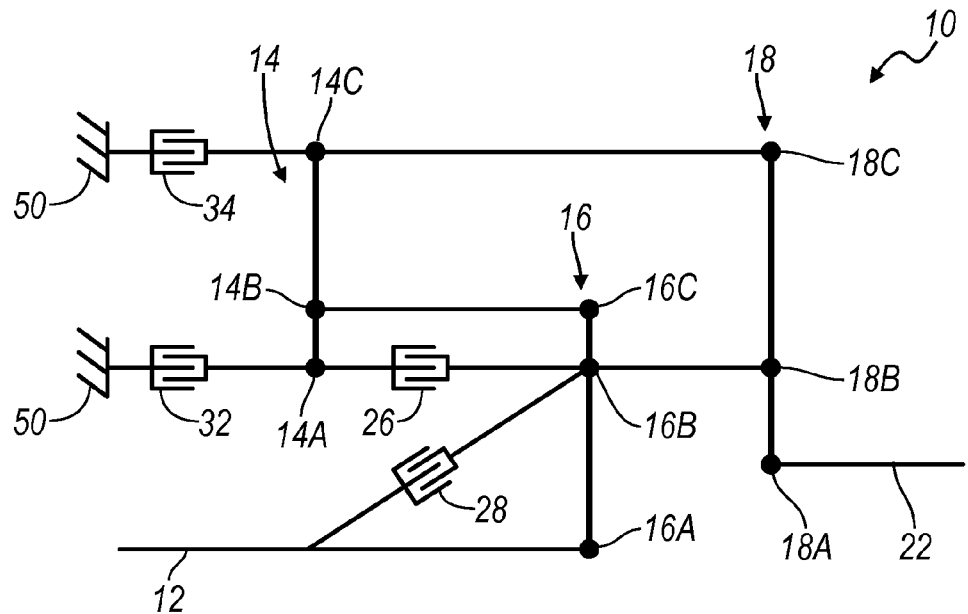
FIG. 1 is a lever diagram of an embodiment of a five speed transmission according to the present invention.

Referring now to FIG. 1, an embodiment of a five speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16 and a third planetary gear set 18 and an output shaft or member 22. In the lever diagram of FIG. 1, the first planetary gear set 14 has three nodes: a first node 14A, a second node 14B and a third node 14C. The second planetary gear set 16 has three nodes: a first node 16A, a second node 16B and a third node 16C. The third planetary gear set 18 has three nodes: a first node 18A, a second node 18B and a third node 18C.

The input member 12 is continuously coupled to the first node 16A of the second planetary gear set 16. The output member 22 is coupled to the first node 18A of the third planetary gear set 18. The second node 14B of the first planetary gear set 14 is coupled to the third node 16C of the second planetary gear set 16. The third node 14C of the first planetary gear set 14 is coupled to the third node 18C of the third planetary gear set 18. The second node 16B of the second planetary gear set 16 is coupled to the second node 18B of the third planetary gear set 18.

A first clutch 26 selectively connects the first node 14A of the first planetary gear set 14 with the second node 16B of the second planetary gear set 16. A second clutch 28 selectively connects the first node 16A of the second planetary gear set 16 and the input member or shaft 12 with the second node 16B of the second planetary gear set 16. A first brake 32 selectively connects the first node 14A of the first planetary gear set 14 with a stationary member or transmission housing 50. A second brake 34 selectively connects the third node 14C of the first planetary gear set 14 with a stationary member or transmission housing 50.

Figure 2:
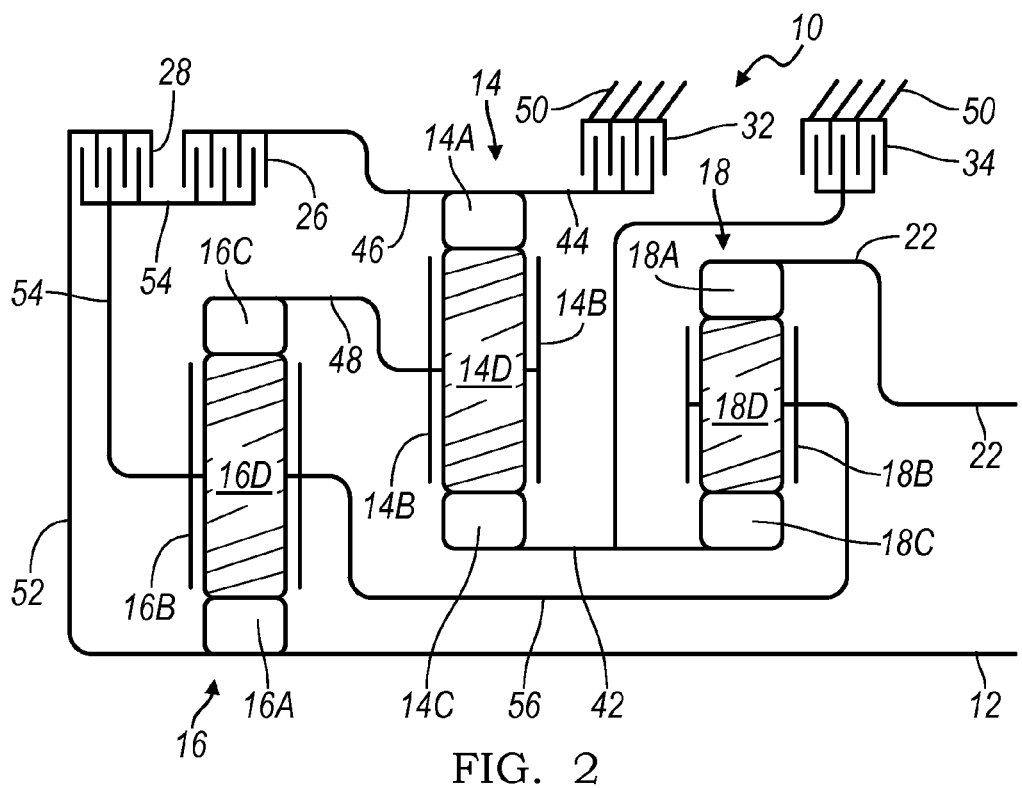
FIG. 2 is a diagrammatic illustration of an embodiment of a five speed transmission according to the present invention.

Referring now to FIG. 2, a stick diagram presents a schematic layout of the embodiment of the five speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44 and a third shaft or interconnecting member 46. The planet carrier member 14B is connected for common rotation with a fourth shaft or interconnecting member 48. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with a fifth shaft or interconnecting member 52 and the input shaft or member 12. The ring gear member 16C is connected for common rotation with the fourth shaft or interconnecting member 48. The planet carrier member 16B is connected for common rotation with a sixth shaft or interconnecting member 54 and a seventh shaft or interconnecting member 56. The planet gears 16D are each configured to intermesh with both the sun gear member 16A and the ring gear member 16C.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a first shaft or interconnecting member 42. The ring gear member 18A is connected for common rotation with the output shaft or member 22. The planet carrier member 18B is connected for common rotation with the seventh shaft or interconnecting member 56. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and first brake 32 and second brake 34 allow for selective interconnection of the shafts or interconnecting members, members of the planetary gear sets and the housing. For example, the first clutch 26 is selectively engageable to connect the third shaft or interconnecting member 46 with the sixth shaft or interconnecting member 54. The second clutch 28 is selectively engageable to connect the fifth shaft or interconnecting member 52 with the sixth shaft or interconnecting member 54. The first brake 32 is selectively engageable to connect the second shaft or interconnecting member 44 with the stationary element or the transmission housing 50 in order to restrict the member 44 from rotating relative to the transmission housing 50. The second brake 34 is selectively engageable to connect the first shaft or interconnecting member 42 with the stationary element or the transmission housing 50 in order to restrict the member 42 from rotating relative to the transmission housing 50.

Figures 3, 4:
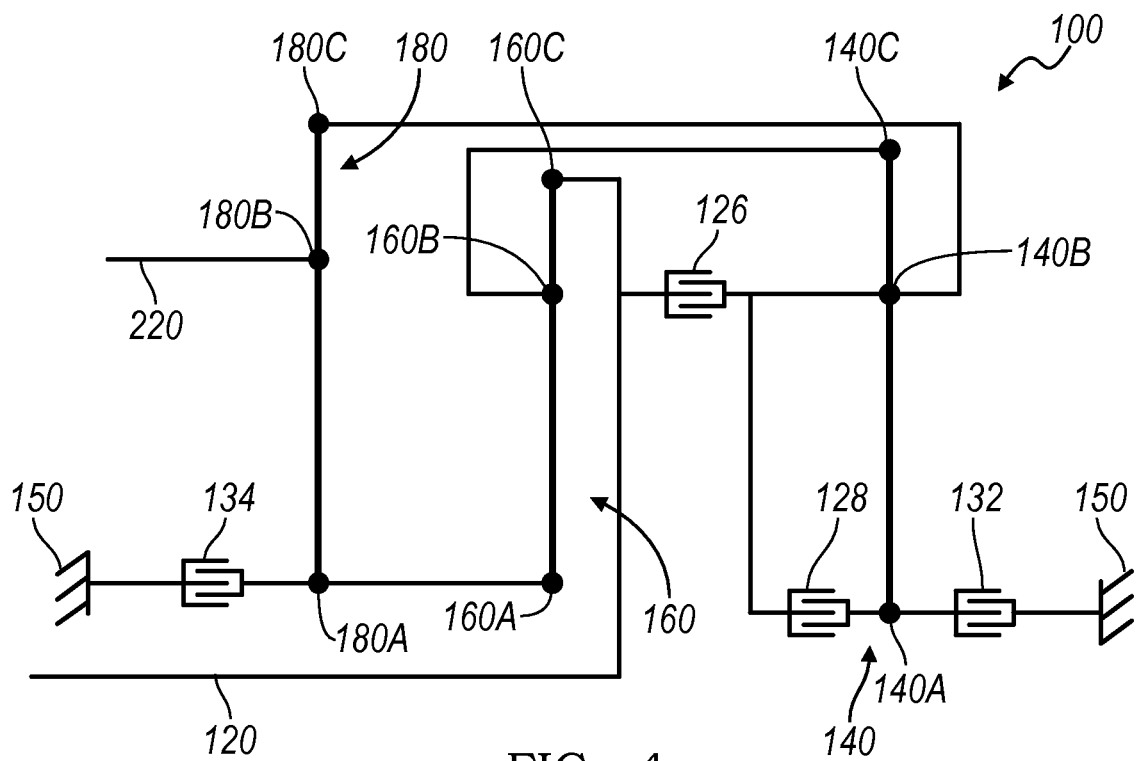
FIG. 3 is a truth table presenting the state of engagement of the various torque transmitting elements in each of the available forward and reverse speeds or gear ratios of the transmission illustrated in FIGS. 1 and 2.
FIG. 4 is a lever diagram of another embodiment of a five speed transmission according to the present invention.

Referring now to FIG. 2 and FIG. 3, the operation of the embodiment of the five speed transmission 10 will be described. It will be appreciated that transmission 10 is capable of transmitting torque from the input shaft or member 12 to the output shaft or member 22 in at least five forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, second clutch 28 and first brake 32 are engaged or activated. The second clutch 28 connects the fifth shaft or interconnecting member 52 with the sixth shaft or interconnecting member 54. The first brake 32 connects the second shaft or interconnecting member 44 with the stationary element or the transmission housing 50 in order to restrict the member 44 from rotating relative to the transmission housing 50. Likewise, the five forward ratios are achieved through different combinations of clutch and brake engagement, as shown in FIG. 3.

It will be appreciated that the foregoing explanation of operation and gear states of the five speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In another embodiment of the present invention, a transmission 100 is provided and illustrated in lever diagram form in FIG. 4. Transmission 100 includes an input shaft or member 120, a first planetary gear set 140, a second planetary gear set 160 and a third planetary gear set 180 and an output shaft or member 220. In the lever diagram of FIG. 4, the first planetary gear set 140 has three nodes: a first node 140A, a second node 140B and a third node 140C. The second planetary gear set 160 has three nodes: a first node 160A, a second node 160B and a third node 160C. The third planetary gear set 180 has three nodes: a first node 180A, a second node 180B and a third node 180C.

The input member 120 is continuously coupled to the first node 160C of the second planetary gear set 160. The output member 220 is coupled to the second node 180B of the third planetary gear set 180. The second node 140B of the first planetary gear set 140 is coupled to the third node 180C the third planetary gear set 180. The third node 140C of the first planetary gear set 140 is coupled to second node 160B the second planetary gear set 160. The first node 160A of the second planetary gear set 160 is coupled to the first node 180A of the third planetary gear set 180.

A first clutch 126 selectively connects the third node 160C of the second planetary gear set 160 and the input member or shaft 120 with the second node 140B of the first planetary gear set 140. A second clutch 128 selectively connects the first node 140A of the first planetary gear set 140 with the second node 140B of the first planetary gear set 140. A first brake 132 selectively connects the first node 140A of the first planetary gear set 140 with a stationary member or transmission housing 150. A second brake 134 selectively connects the first node 180A of the third planetary gear set 180 with a stationary member or transmission housing 150.

Figures 5, 6:
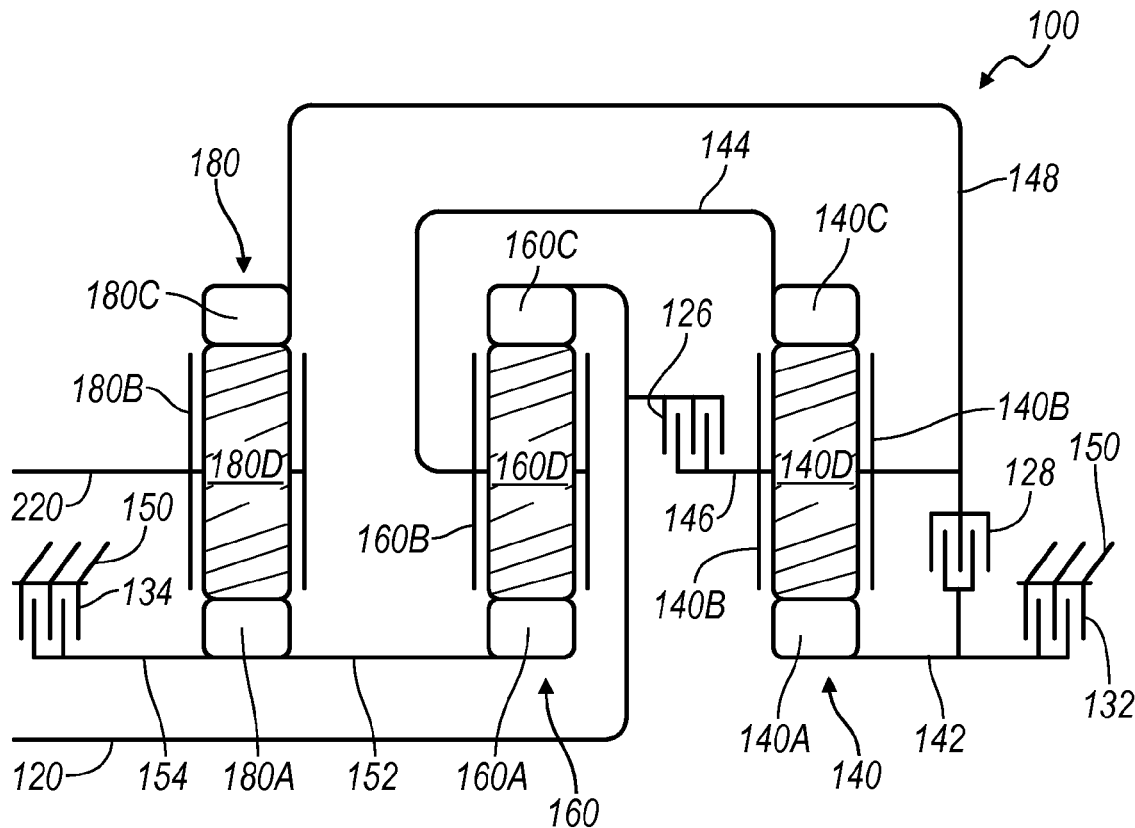
FIG. 5 is a diagrammatic illustration of another embodiment of a five speed transmission according to the present invention.
FIG. 6 is a truth table presenting the state of engagement of the various torque transmitting elements in each of the available forward and reverse speeds or gear ratios of the transmission illustrated in FIGS. 4 and 5.

Referring now to FIG. 5, a stick diagram presents a schematic layout of the embodiment of the five speed transmission 100 according to the present invention. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, the planetary gear set 140 includes a sun gear member 140A, a ring gear member 140C and a planet gear carrier member 140B that rotatably supports a set of planet gears 140D (only one of which is shown). The sun gear member 140A is connected for common rotation with a first shaft or interconnecting member 142. The ring gear member 140C is connected for common rotation with a second shaft or interconnecting member 144. The planet carrier member 140B is connected for common rotation with a third shaft or interconnecting member 146 and a fourth shaft or interconnecting member 148. The planet gears 140D are each configured to intermesh with both the sun gear member 140A and the ring gear member 140C.

The planetary gear set 160 includes a sun gear member 160A, a ring gear member 160C and a planet gear carrier member 160B that rotatably supports a set of planet gears 160D (only one of which is shown). The sun gear member 160A is connected for common rotation with a fifth shaft or interconnecting member 152. The ring gear member 160C is connected for common rotation with the input shaft or member 120. The planet carrier member 160B is connected for common rotation with the second shaft or interconnecting member 144. The planet gears 160D are each configured to intermesh with both the sun gear member 160A and the ring gear member 160C.

The planetary gear set 180 includes a sun gear member 180A, a ring gear member 180C and a planet gear carrier member 180B that rotatably supports a set of planet gears 180D (only one of which is shown). The sun gear member 180A is connected for common rotation with the fifth shaft or interconnecting member 152 and a sixth shaft or interconnecting member 154. The ring gear member 180C is connected for common rotation with the fourth shaft or interconnecting member 148. The planet carrier member 180B is connected for common rotation with output shaft or member 220. The planet gears 180D are each configured to intermesh with both the sun gear member 180A and the ring gear member 180C.

The input shaft or member 120 is continuously connected to an engine (not shown) or to a turbine of a torque converter (not shown) or input clutch (not shown). The output shaft or member 220 is continuously connected with the final drive unit or transfer case (not shown).

The torque-transmitting mechanisms or clutches 126, 128 and first brake 132 and second brake 134 allow for selective interconnection of the shafts or interconnecting members, members of the planetary gear sets and the housing. For example, the first clutch 126 is selectively engageable to connect the input shaft or member 120 with the third shaft or interconnecting member 146. The second clutch 128 is selectively engageable to connect the first shaft or interconnecting member 142 with the fourth shaft or interconnecting member 148. The first brake 132 is selectively engageable to connect the first shaft or interconnecting member 142 with the stationary element or the transmission housing 150 in order to restrict the member 142 from rotating relative to the transmission housing 150. The second brake 134 is selectively engageable to connect the sixth shaft or interconnecting member 154 with the stationary element or the transmission housing 150 in order to restrict the member 154 from rotating relative to the transmission housing 150.

Referring now to FIG. 4 and FIG. 5, the operation of the embodiment of the five speed transmission 100 will be described. It will be appreciated that transmission 100 is capable of transmitting torque from the input shaft or member 120 to the output shaft or member 220 in at least five forward speed or torque ratios and at least one reverse speed or torque ratio. Each forward and reverse speed or torque ratio is attained by engagement of one or more of the torque-transmitting mechanisms (i.e. first clutch 126, second clutch 128, first brake 132 and second brake 134), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, second clutch 128 and first brake 132 are engaged or activated. The second clutch 128 connects the first shaft or interconnecting member 142 with the fourth shaft or interconnecting member 148. The first brake 132 connects the first shaft or interconnecting member 142 with the stationary element or the transmission housing 150 in order to restrict the member 142 from rotating relative to the transmission housing 150. Likewise, the five forward ratios are achieved through different combinations of clutch and brake engagement, as shown in FIG. 6.

It will be appreciated that the foregoing explanation of operation and gear states of the five speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 7:
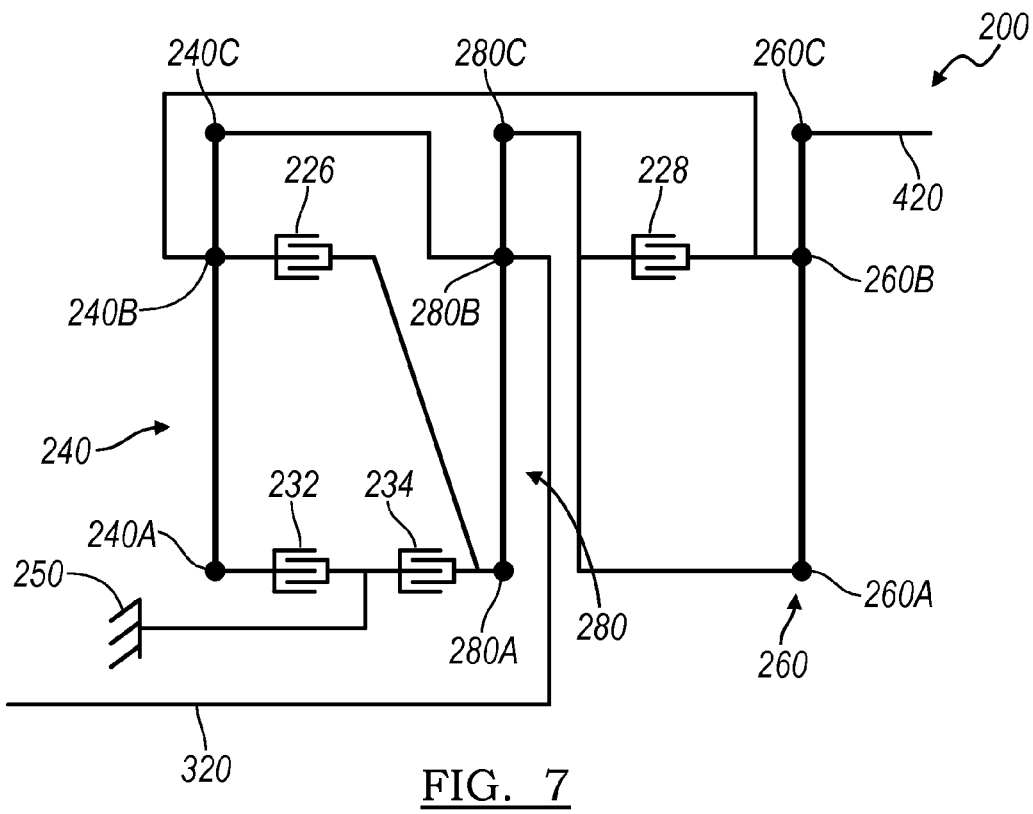
FIG. 7 is a lever diagram of yet another embodiment of a five speed transmission according to the present invention.

In yet another embodiment of the present invention, a transmission 200 is provided and illustrated in lever diagram form in FIG. 7. Transmission 200 includes an input shaft or member 320, a first planetary gear set 240, a second planetary gear set 260 and a third planetary gear set 280 and an output shaft or member 420. In the lever diagram of FIG. 7, the first planetary gear set 240 has three nodes: a first node 240A, a second node 240B and a third node 240C. The second planetary gear set 260 has three nodes: a first node 260A, a second node 260B and a third node 260C. The third planetary gear set 280 has three nodes: a first node 280A, a second node 280B and a third node 280C.

The input member 320 is continuously coupled to the second node 280B of the third planetary gear set 280. The output member 420 is coupled to the third node 260C of the second planetary gear set 260. The second node 240B of the first planetary gear set 240 is coupled to the second node 260B the second planetary gear set 260. The third node 240C of the first planetary gear set 240 is coupled to second node 280B the third planetary gear set 280. The first node 260A of the second planetary gear set 260 is coupled to the third node 280C of the third planetary gear set 280.

A first clutch 226 selectively connects the second node 240B of the first planetary gear set 240 with the first node 280A of the third planetary gear set 280. A second clutch 228 selectively connects the second node 260B of the second planetary gear set 260 and the second node 240B of the first planetary gear set 240 with the first node 260A of the second planetary gear set 260 and the third node 280C of the third planetary gear set 280. A first brake 232 selectively connects the first node 240A of the first planetary gear set 240 with a stationary member or transmission housing 250. A second brake 234 selectively connects the first node 280A of the third planetary gear set 280 with a stationary member or transmission housing 250.

Figure 8:
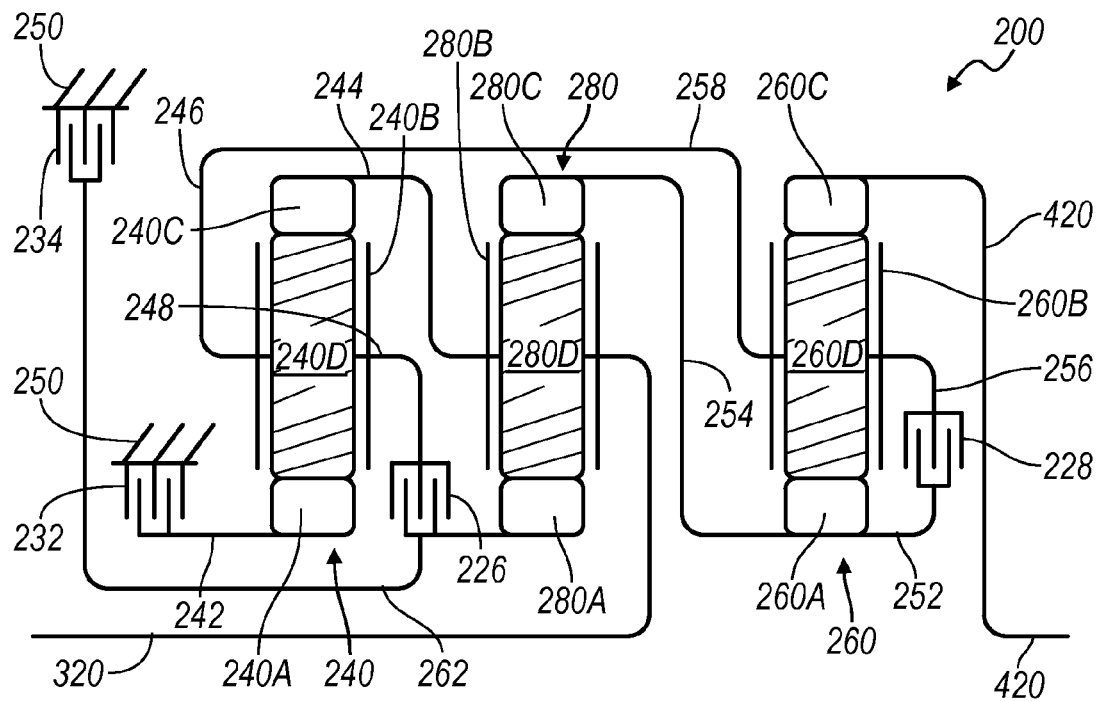
FIG. 8 is a diagrammatic illustration of yet another embodiment of a five speed transmission according to the present invention.

Referring now to FIG. 8, a stick diagram presents a schematic layout of the embodiment of the five speed transmission 200 according to the present invention. In FIG. 8, the numbering from the lever diagram of FIG. 7 is carried over. The clutches and couplings are correspondingly presented whereas the nodes of the planetary gear sets now appear as components of planetary gear sets such as sun gears, ring gears, planet gears and planet gear carriers.

For example, the planetary gear set 240 includes a sun gear member 240A, a ring gear member 240C and a planet gear carrier member 240B that rotatably supports a set of planet gears 240D (only one of which is shown). The sun gear member 240A is connected for common rotation with a first shaft or interconnecting member 242. The ring gear member 240C is connected to a second shaft or interconnecting member 244. The planet carrier member 240B is connected for common rotation with a third shaft or interconnecting member 246 and a fourth shaft or interconnecting member 248. The planet gears 240D are each configured to intermesh with both the sun gear member 240A and the ring gear member 240C.

The planetary gear set 260 includes a sun gear member 260A, a ring gear member 260C and a planet gear carrier member 260B that rotatably supports a set of planet gears 260D (only one of which is shown). The sun gear member 260A is connected for common rotation with a fifth shaft or interconnecting member 252 and a sixth shaft or interconnecting member 254. The ring gear member 260C is connected for common rotation with the output shaft or member 420. The planet carrier member 260B is connected for common rotation with a seventh shaft or interconnecting member 256 and an eighth shaft or interconnecting member 258. The planet gears 260D are each configured to intermesh with both the sun gear member 260A and the ring gear member 260C.

The planetary gear set 280 includes a sun gear member 280A, a ring gear member 280C and a planet gear carrier member 280B that rotatably supports a set of planet gears 280D (only one of which is shown). The sun gear member 280A is connected for common rotation with a ninth shaft or interconnecting member 262. The ring gear member 280C is connected for common rotation with the sixth shaft or interconnecting member 254. The planet carrier member 280B is connected for common rotation with a second shaft or interconnecting member 244 and input shaft or member 320. The planet gears 280D are each configured to intermesh with both the sun gear member 280A and the ring gear member 280C.

The input shaft or member 320 is continuously connected to an engine (not shown) or to a turbine of a torque converter (not shown) or input clutch (not shown). The output shaft or member 420 is continuously connected with the final drive unit or transfer case (not shown).

The torque-transmitting mechanisms or clutches 226, 228 and first brake 232 and second brake 234 allow for selective interconnection of the shafts or interconnecting members, members of the planetary gear sets and the housing. For example, the first clutch 226 is selectively engageable to connect the fourth shaft or interconnecting member 248 with the ninth shaft or interconnecting member 262. The second clutch 228 is selectively engageable to connect the fifth shaft or interconnecting member 252 with the seventh shaft or interconnecting member 256. The first brake 232 is selectively engageable to connect the first shaft or interconnecting member 242 with the stationary element or the transmission housing 250 in order to restrict the member 242 from rotating relative to the transmission housing 250. The second brake 234 is selectively engageable to connect the ninth shaft or interconnecting member 262 with the stationary element or the transmission housing 250 in order to restrict the member 262 from rotating relative to the transmission housing 250.

Figures 9, 10:
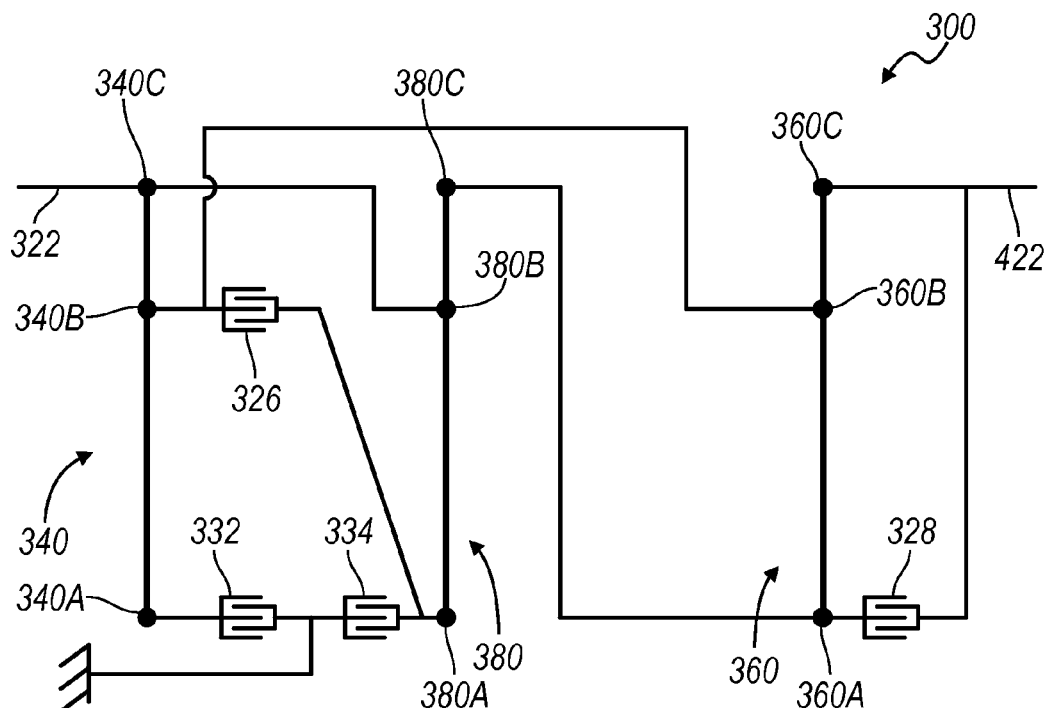
FIG. 9 is a truth table presenting the state of engagement of the various torque transmitting elements in each of the available forward and reverse speeds or gear ratios of the transmission illustrated in FIGS. 7 and 8.
FIG. 10 is a lever diagram of yet another embodiment of a five speed transmission according to the present invention.

Referring now to FIG. 7 and FIG. 8, the operation of the embodiment of the five speed transmission 200 will be described. It will be appreciated that transmission 200 is capable of transmitting torque from the input shaft or member 320 to the output shaft or member 420 in at least five forward speed or torque ratios and at least one reverse speed or torque ratio. Each forward and reverse speed or torque ratio is attained by engagement of one or more of the torque-transmitting mechanisms (i.e. first clutch 226, second clutch 228, first brake 232 and second brake 234), as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish a reverse gear, first clutch 226 and second brake 234 are engaged or activated. The first clutch 226 connects the fourth shaft or interconnecting member 248 with the ninth shaft or interconnecting member 262. The second brake 234 connects the ninth shaft or interconnecting member 262 with the stationary element or the transmission housing 250 in order to restrict the member 262 from rotating relative to the transmission housing 250. Likewise, the five forward ratios are achieved through different combinations of clutch and brake engagement, as shown in FIG. 9.

It will be appreciated that the foregoing explanation of operation and gear states of the five speed transmission 200 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In yet another embodiment of the present invention, a transmission 300 is provided and illustrated in lever diagram form in FIG. 10. Transmission 300 includes an input shaft or member 322, a first planetary gear set 340, a second planetary gear set 360 and a third planetary gear set 380 and an output shaft or member 422. In the lever diagram of FIG. 10, the first planetary gear set 340 has three nodes: a first node 340A, a second node 340B and a third node 340C. The second planetary gear set 360 has three nodes: a first node 360A, a second node 360B and a third node 360C. The third planetary gear set 380 has three nodes: a first node 380A, a second node 380B and a third node 380C.

The input member 322 is continuously coupled to the third node 340C of the first planetary gear set 340. The output member 422 is coupled to the third node 360C of the second planetary gear set 360. The second node 340B of the first planetary gear set 340 is coupled to the second node 360B of the second planetary gear set 360. The third node 340C of the first planetary gear set 340 is coupled to second node 380B the third planetary gear set 380. The first node 360A of the second planetary gear set 360 is coupled to the third node 380C of the third planetary gear set 380.

A first clutch 326 selectively connects the second node 340B of the first planetary gear set 340 and the second node 360B of the second planetary gear set 360 with the first node 380A of the third planetary gear set 380. A second clutch 328 selectively connects the first node 360A of the second planetary gear set 360 with the third node 360C of the second planetary gear set 360 and the output shaft or member 422. A first brake 332 selectively connects the first node 340A of the first planetary gear set 340 with a stationary member or transmission housing 350. A second brake 334 selectively connects the first node 380A of the third planetary gear set 380 with a stationary member or transmission housing 350.

Figures 11, 12:
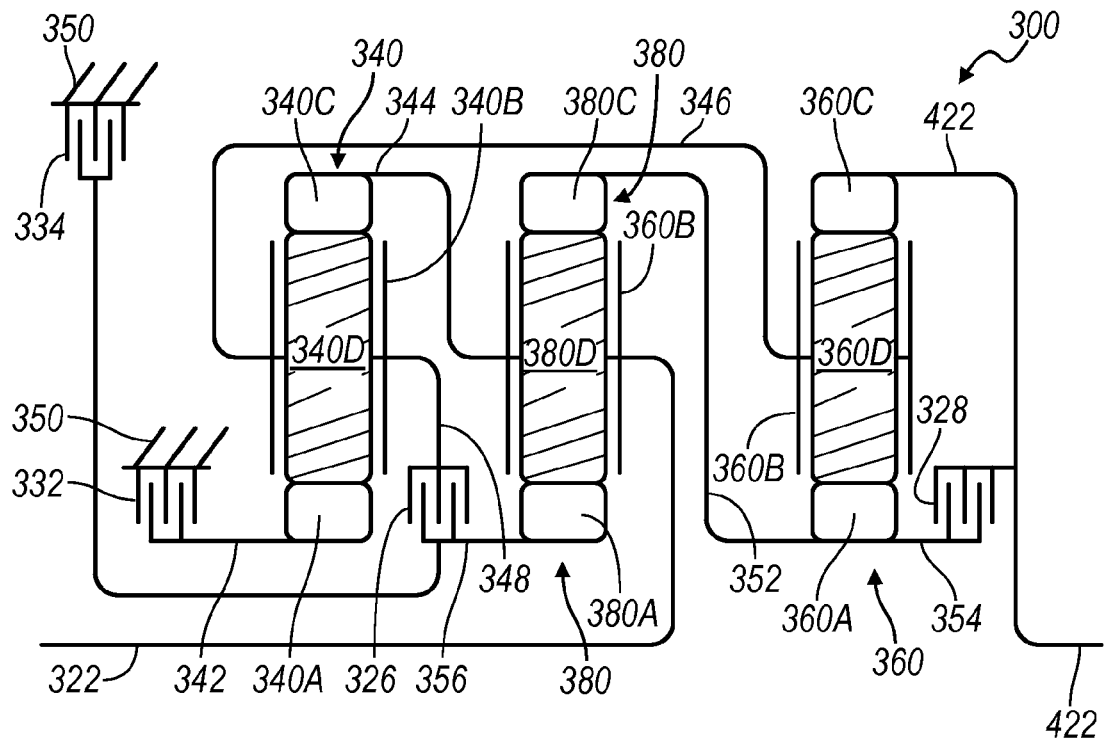
FIG. 11 is a diagrammatic illustration of yet another embodiment of a five speed transmission according to the present invention.
FIG. 12 is a truth table presenting the state of engagement of the various torque transmitting elements in each of the available forward and reverse speeds or gear ratios of the transmission illustrated in FIGS. 10 and 11.

Referring now to FIG. 11, a stick diagram presents a schematic layout of the embodiment of the five speed transmission 300 according to the present invention. In FIG. 11, the numbering from the lever diagram of FIG. 10 is carried over. The clutches and couplings are correspondingly presented whereas the nodes of the planetary gear sets now appear as components of planetary gear sets such as sun gears, ring gears, planet gears and planet gear carriers.

For example, the planetary gear set 340 includes a sun gear member 340A, a ring gear member 340C and a planet gear carrier member 340B that rotatably supports a set of planet gears 340D (only one of which is shown). The sun gear member 340A is connected for common rotation with a first shaft or interconnecting member 342. The ring gear member 340C is connected to a second shaft or interconnecting member 344. The planet carrier member 340B is connected for common rotation with a third shaft or interconnecting member 346 and a fourth shaft or interconnecting member 348. The planet gears 340D are each configured to intermesh with both the sun gear member 340A and the ring gear member 340C.

The planetary gear set 360 includes a sun gear member 360A, a ring gear member 360C and a planet gear carrier member 360B that rotatably supports a set of planet gears 360D (only one of which is shown). The sun gear member 360A is connected for common rotation with a fifth shaft or interconnecting member 352 and a sixth shaft or interconnecting member 354. The ring gear member 360C is connected for common rotation with the output shaft or member 422. The planet carrier member 360B is connected for common rotation with the third shaft or interconnecting member 346. The planet gears 360D are each configured to intermesh with both the sun gear member 360A and the ring gear member 360C.

The planetary gear set 380 includes a sun gear member 380A, a ring gear member 380C and a planet gear carrier member 380B that rotatably supports a set of planet gears 380D (only one of which is shown). The sun gear member 380A is connected for common rotation with a seventh shaft or interconnecting member 356. The ring gear member 380C is connected for common rotation with the fifth shaft or interconnecting member 352. The planet carrier member 380B is connected for common rotation with a second shaft or interconnecting member 344 and input shaft or member 322. The planet gears 380D are each configured to intermesh with both the sun gear member 380A and the ring gear member 380C.

The input shaft or member 322 is continuously connected to an engine (not shown) or to a turbine of a torque converter (not shown) or input clutch (not shown). The output shaft or member 422 is continuously connected with the final drive unit or transfer case (not shown).

The torque-transmitting mechanisms or clutches 326, 328 and first brake 332 and second brake 334 allow for selective interconnection of the shafts or interconnecting members, members of the planetary gear sets and the housing. For example, the first clutch 326 is selectively engageable to connect the fourth shaft or interconnecting member 348 with the seventh shaft or interconnecting member 356. The second clutch 328 is selectively engageable to connect the sixth shaft or interconnecting member 354 with the output shaft or member 422. The first brake 332 is selectively engageable to connect the first shaft or interconnecting member 342 with the stationary element or the transmission housing 350 in order to restrict the member 342 from rotating relative to the transmission housing 350. The second brake 334 is selectively engageable to connect the seventh shaft or interconnecting member 356 with the stationary element or the transmission housing 350 in order to restrict the member 356 from rotating relative to the transmission housing 350.

Referring now to FIG. 10 and FIG. 11, the operation of the embodiment of the five speed transmission 300 will be described. It will be appreciated that transmission 300 is capable of transmitting torque from the input shaft or member 322 to the output shaft or member 422 in at least five forward speed or torque ratios and at least one reverse speed or torque ratio. Each forward and reverse speed or torque ratio is attained by engagement of one or more of the torque-transmitting mechanisms (i.e. first clutch 326, second clutch 328, first brake 332 and second brake 334), as will be explained below. FIG. 12 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 300. An example of the gear ratios that may be obtained using the embodiments of the present invention are also shown in FIG. 12. Of course, other gear ratios are achievable depending on the gear diameter, gear teeth count and gear configuration selected.

To establish a reverse gear, first clutch 326 and second brake 334 are engaged or activated. The first clutch 326 connects the fourth shaft or interconnecting member 348 with the seventh shaft or interconnecting member 356. The second brake 334 connects the seventh shaft or interconnecting member 356 with the stationary element or the transmission housing 350 in order to restrict the member 356 from rotating relative to the transmission housing 350. Likewise, the five forward ratios are achieved through different combinations of clutch and brake engagement, as shown in FIG. 12.

It will be appreciated that the foregoing explanation of operation and gear states of the five speed transmission 300 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 13:
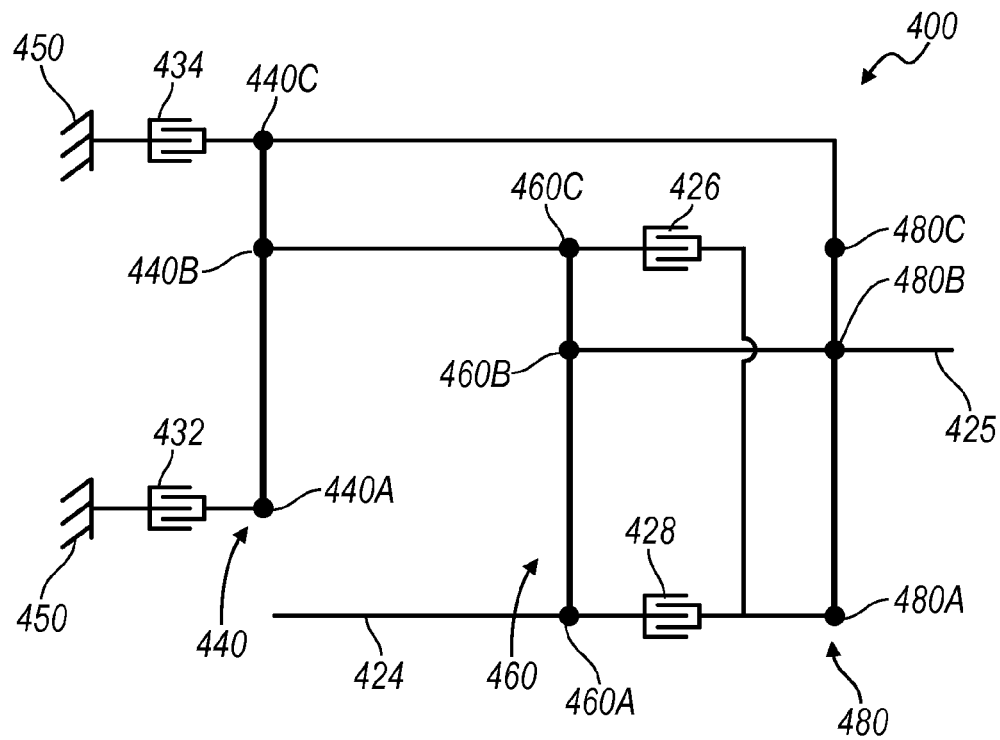
FIG. 13 is a lever diagram of yet another embodiment of a five speed transmission according to the present invention.

In yet another embodiment of the present invention, a transmission 400 is provided and illustrated in lever diagram form in FIG. 13. Transmission 400 includes an input shaft or member 424, a first planetary gear set 440, a second planetary gear set 460 and a third planetary gear set 480 and an output shaft or member 425. In the lever diagram of FIG. 13, the first planetary gear set 440 has three nodes: a first node 440A, a second node 440B and a third node 440C. The second planetary gear set 460 has three nodes: a first node 460A, a second node 460B and a third node 460C. The third planetary gear set 480 has three nodes: a first node 480A, a second node 480B and a third node 480C.

The input member 424 is continuously coupled to the third node 460A of the first planetary gear set 460. The output member 425 is coupled to the third node 480B of the second planetary gear set 480. The second node 440B of the first planetary gear set 440 is coupled to the third node 460C of the second planetary gear set 460. The third node 440C of the first planetary gear set 440 is coupled to third node 480C the third planetary gear set 480. The second node 460B of the second planetary gear set 460 is coupled to the second node 480B of the third planetary gear set 480.

A first clutch 426 selectively connects the third node 460C of the second planetary gear set 460 with the first node 480A of the third planetary gear set 480. A second clutch 428 selectively connects the first node 460A of the second planetary gear set 460 with the first node 480A of the third planetary gear set 480. A first brake 432 selectively connects the first node 440A of the first planetary gear set 440 with a stationary member or transmission housing 450. A second brake 434 selectively connects the third node 440C of the first planetary gear set 440 with a stationary member or transmission housing 450.

Figure 14:
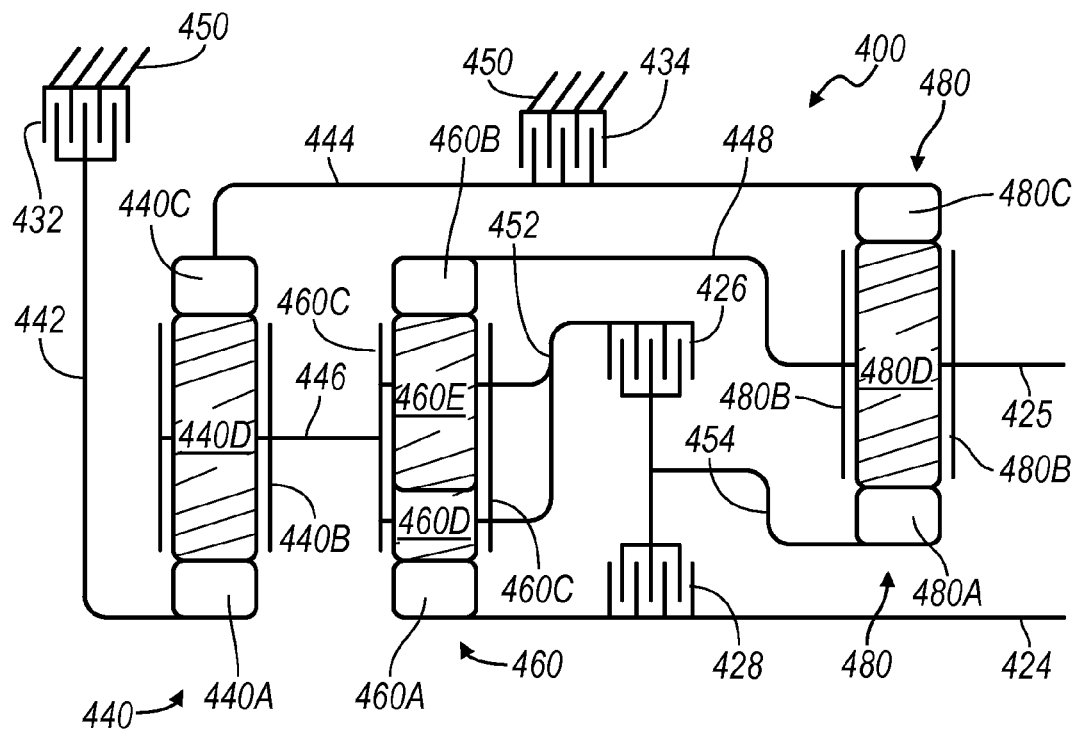
FIG. 14 is a diagrammatic illustration of yet another embodiment of a five speed transmission according to the present invention.

Referring now to FIG. 14, a stick diagram presents a schematic layout of the embodiment of the five speed transmission 400 according to the present invention. In FIG. 14, the numbering from the lever diagram of FIG. 13 is carried over. The clutches and couplings are correspondingly presented whereas the nodes of the planetary gear sets now appear as components of planetary gear sets such as sun gears, ring gears, planet gears and planet gear carriers.

For example, the first planetary gear set 440 includes a sun gear member 440A, a ring gear member 440C and a planet gear carrier member 440B that rotatably supports a set of planet gears 440D (only one of which is shown). The sun gear member 440A is connected for common rotation with a first shaft or interconnecting member 442. The ring gear member 440C is connected to a second shaft or interconnecting member 444. The planet carrier member 440B is connected for common rotation with a third shaft or interconnecting member 446. The planet gears 440D are each configured to intermesh with both the sun gear member 440A and the ring gear member 440C.

The second planetary gear set 460 includes a sun gear member 460A, a ring gear member 460B and a planet gear carrier member 460C that rotatably supports a first set of planet gears 460D (only one of which is shown) and a second set of planet gears 460E (only one of which is shown). The sun gear member 460A is connected for common rotation with the input shaft or member 424. The ring gear member 460B is connected for common rotation with a fourth shaft or interconnecting member 448. The planet carrier member 460C is connected for common rotation with the third shaft or interconnecting member 446 and with a fifth shaft or interconnecting member 452. The first set of planet gears 460D are each configured to intermesh with both the sun gear member 460A and second set of planet gears 460E. The second set of planet gears 460E are each configured to intermesh with both the ring gear member 460B and first set of planet gears 460D.

The third planetary gear set 480 includes a sun gear member 480A, a ring gear member 480C and a planet gear carrier member 480B that rotatably supports a set of planet gears 480D (only one of which is shown). The sun gear member 480A is connected for common rotation with a sixth shaft or interconnecting member 454. The ring gear member 480C is connected for common rotation with second shaft or interconnecting member 444. The planet carrier member 480B is connected for common rotation with the fourth shaft or interconnecting member 448 and output shaft or member 425. The planet gears 480D are each configured to intermesh with both the sun gear member 480A and the ring gear member 480C.

The input shaft or member 424 is continuously connected to an engine (not shown) or to a turbine of a torque converter (not shown) or input clutch (not shown). The output shaft or member 425 is continuously connected with the final drive unit or transfer case (not shown).

The torque-transmitting mechanisms or clutches 426, 428 and first brake 432 and second brake 434 allow for selective interconnection of the shafts or interconnecting members, members of the planetary gear sets and the housing. For example, the first clutch 426 is selectively engageable to connect the fifth shaft or interconnecting member 452 with the sixth shaft or interconnecting member 454. The second clutch 428 is selectively engageable to connect the sixth shaft or interconnecting member 454 with the input shaft or member 424. The first brake 432 is selectively engageable to connect the first shaft or interconnecting member 442 with the stationary element or the transmission housing 450 in order to restrict the member 442 from rotating relative to the transmission housing 450. The second brake 434 is selectively engageable to connect the second shaft or interconnecting member 444 with the stationary element or the transmission housing 450 in order to restrict the member 444 from rotating relative to the transmission housing 450.

Figures 15, 16:
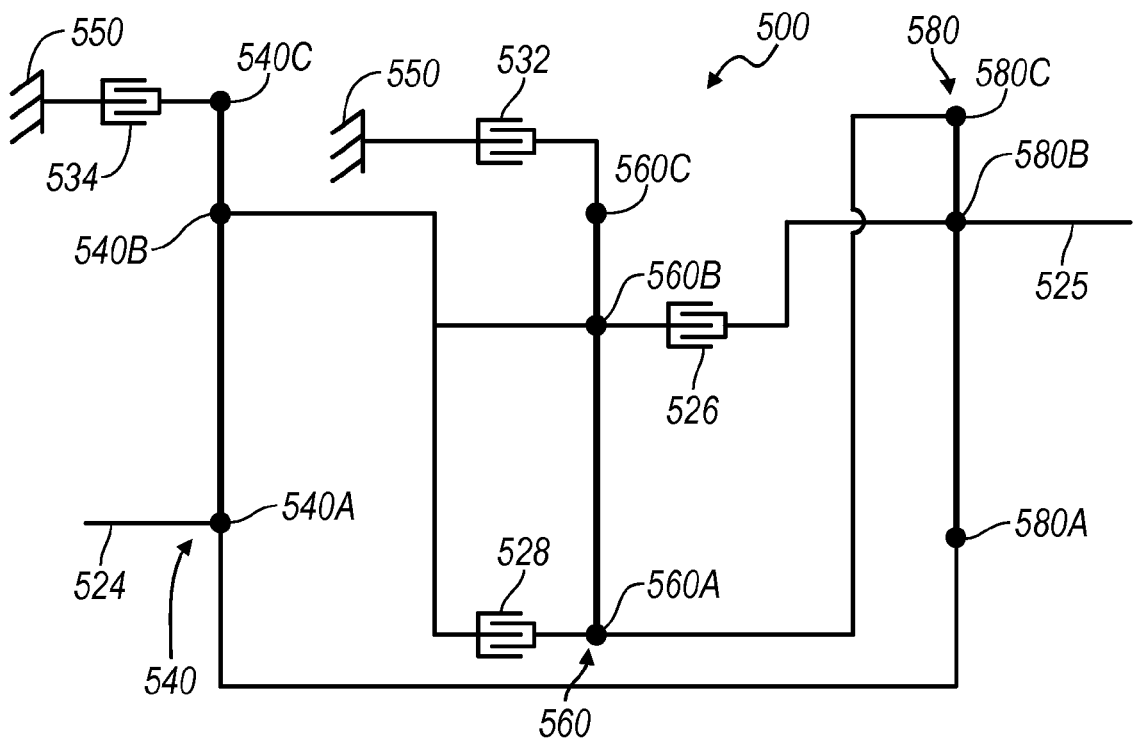
FIG. 15 is a truth table presenting the state of engagement of the various torque transmitting elements in each of the available forward and reverse speeds or gear ratios of the transmission illustrated in FIGS. 13 and 14.
FIG. 16 is a lever diagram of yet another embodiment of a five speed transmission according to the present invention.

Referring now to FIG. 13 and FIG. 14, the operation of the embodiment of the five speed transmission 400 will be described. It will be appreciated that transmission 400 is capable of transmitting torque from the input shaft or member 424 to the output shaft or member 425 in at least five forward speed or torque ratios and at least one reverse speed or torque ratio. Each forward and reverse speed or torque ratio is attained by engagement of one or more of the torque-transmitting mechanisms (i.e. first clutch 426, second clutch 428, first brake 432 and second brake 434), as will be explained below. FIG. 15 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 400. An example of the gear ratios that may be obtained using the embodiments of the present invention are also shown in FIG. 15. Of course, other gear ratios are achievable depending on the gear diameter, gear teeth count and gear configuration selected.

To establish a reverse gear, first clutch 426 and second brake 434 are engaged or activated. The first clutch 426 connects the fifth shaft or interconnecting member 452 with the sixth shaft or interconnecting member 454. The second brake 434 connects the second shaft or interconnecting member 444 with the stationary element or the transmission housing 450 in order to restrict the member 444 from rotating relative to the transmission housing 450. Likewise, the five forward ratios are achieved through different combinations of clutch and brake engagement, as shown in FIG. 15.

It will be appreciated that the foregoing explanation of operation and gear states of the five speed transmission 400 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In yet another embodiment of the present invention, a transmission 500 is provided and illustrated in lever diagram form in FIG. 16. Transmission 500 includes an input shaft or member 524, a first planetary gear set 540, a second planetary gear set 560 and a third planetary gear set 580 and an output shaft or member 525. In the lever diagram of FIG. 16, the first planetary gear set 540 has three nodes: a first node 540A, a second node 540B and a third node 540C. The second planetary gear set 560 has three nodes: a first node 560A, a second node 560B and a third node 560C. The third planetary gear set 580 has three nodes: a first node 580A, a second node 580B and a third node 580C.

The input member 524 is continuously coupled to the first node 540A of the first planetary gear set 540. The output member 525 is coupled to the second node 580B of the second planetary gear set 580. The second node 540B of the first planetary gear set 540 is coupled to the second node 560B of the second planetary gear set 560. The first node 540A of the first planetary gear set 540 is coupled to first node 580A of the third planetary gear set 580. The first node 560A of the second planetary gear set 560 is coupled to the third node 580C of the third planetary gear set 580.

A first clutch 526 selectively connects the second node 560B of the second planetary gear set 560 and the second node 540B of the first planetary gear set 540 with the first node 580B of the third planetary gear set 580 and the output shaft or member 525. A second clutch 528 selectively connects the first node 560A of the second planetary gear set 560 and the third node 580C of the third planetary gear set 580 with the second node 560B of the second planetary gear set 560 and the second node 540B of the first planetary gear set 540. A first brake 532 selectively connects the third node 560C of the second planetary gear set 560 with a stationary member or transmission housing 550. A second brake 534 selectively connects the third node 540C of the first planetary gear set 540 with a stationary member or transmission housing 550.

Figures 17, 18:
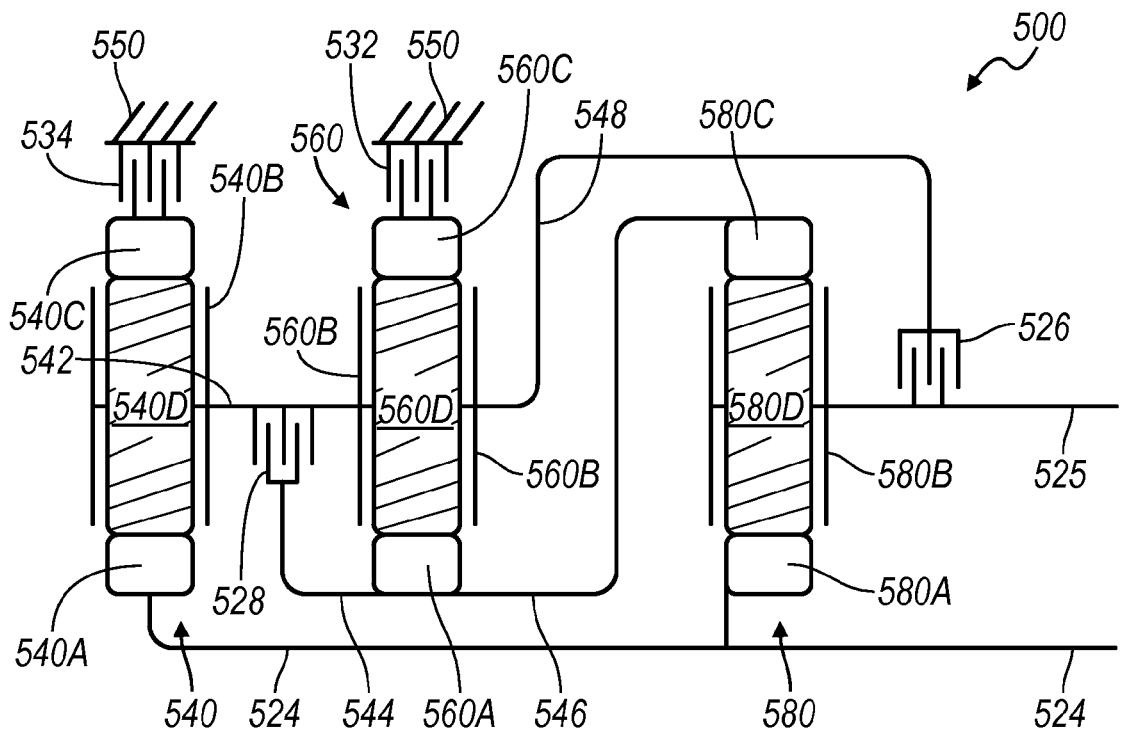
FIG. 17 is a diagrammatic illustration of yet another embodiment of a five speed transmission according to the present invention.
FIG. 18 is a truth table presenting the state of engagement of the various torque transmitting elements in each of the available forward and reverse speeds or gear ratios of the transmission illustrated in FIGS. 16 and 17.

Referring now to FIG. 17, a stick diagram presents a schematic layout of the embodiment of the five speed transmission 500 according to the present invention. In FIG. 17, the numbering from the lever diagram of FIG. 16 is carried over. The clutches and couplings are correspondingly presented whereas the nodes of the planetary gear sets now appear as components of planetary gear sets such as sun gears, ring gears, planet gears and planet gear carriers.

For example, the planetary gear set 540 includes a sun gear member 540A, a ring gear member 540C and a planet gear carrier member 540B that rotatably supports a set of planet gears 540D (only one of which is shown). The sun gear member 540A is connected for common rotation with the input shaft or member 524. The ring gear member 540C is connected to a second brake 534 for selective coupling of ring gear member 540C to transmission housing 550, as described below. The planet carrier member 540B is connected for common rotation with a first shaft or interconnecting member 542. The planet gears 540D are each configured to intermesh with both the sun gear member 540A and the ring gear member 540C.

The planetary gear set 560 includes a sun gear member 560A, a ring gear member 560C and a planet gear carrier member 360B that rotatably supports a set of planet gears 560D (only one of which is shown). The sun gear member 560A is connected for common rotation with a second shaft or interconnecting member 544 and a third shaft or interconnecting member 546. The ring gear member 560C is connected to a first brake 532 for selective coupling of ring gear member 560C to transmission housing 550, as described below. The planet carrier member 560B is connected for common rotation with the first shaft or interconnecting member 542 and a fourth shaft or interconnecting member 548. The planet gears 560D are each configured to intermesh with both the sun gear member 560A and the ring gear member 560C.

The planetary gear set 580 includes a sun gear member 580A, a ring gear member 580C and a planet gear carrier member 580B that rotatably supports a set of planet gears 580D (only one of which is shown). The sun gear member 580A is connected for common rotation with the input shaft or member 524. The ring gear member 580C is connected for common rotation with the third shaft or interconnecting member 546. The planet carrier member 580B is connected for common rotation with the output shaft or member 525. The planet gears 580D are each configured to intermesh with both the sun gear member 580A and the ring gear member 580C.

The input shaft or member 524 is continuously connected to an engine (not shown) or to a turbine of a torque converter (not shown) or input clutch (not shown). The output shaft or member 525 is continuously connected with the final drive unit or transfer case (not shown).

The torque-transmitting mechanisms or clutches 526, 528 and first brake 532 and second brake 534 allow for selective interconnection of the shafts or interconnecting members, members of the planetary gear sets and the housing. For example, the first clutch 526 is selectively engageable to connect the fourth shaft or interconnecting member 548 with the output shaft or member 525. The second clutch 528 is selectively engageable to connect the first shaft or interconnecting member 542 with the second shaft or interconnecting member 544. The first brake 532 is selectively engageable to connect the ring gear member 560C with the stationary element or the transmission housing 550 in order to restrict the member 560C from rotating relative to the transmission housing 550. The second brake 534 is selectively engageable to connect the ring gear member 540C with the stationary element or the transmission housing 550 in order to restrict the member 540C from rotating relative to the transmission housing 550.

Referring now to FIG. 16 and FIG. 17, the operation of the embodiment of the five speed transmission 500 will be described. It will be appreciated that transmission 500 is capable of transmitting torque from the input shaft or member 524 to the output shaft or member 525 in at least five forward speed or torque ratios and at least one reverse speed or torque ratio. Each forward and reverse speed or torque ratio is attained by engagement of one or more of the torque-transmitting mechanisms (i.e. first clutch 526, second clutch 528, first brake 532 and second brake 534), as will be explained below. FIG. 18 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 500. An example of the gear ratios that may be obtained using the embodiments of the present invention are also shown in FIG. 18. Of course, other gear ratios are achievable depending on the gear diameter, gear teeth count and gear configuration selected.

To establish a reverse gear, first clutch 526 and first brake 532 are engaged or activated. The first clutch 526 connects the fourth shaft or interconnecting member 548 with the output shaft or member 525. The first brake 532 connects the ring gear member 560C with the stationary element or the transmission housing 550 in order to restrict the member 560C from rotating relative to the transmission housing 550. Likewise, the five forward ratios are achieved through different combinations of clutch and brake engagement, as shown in FIG. 18.

It will be appreciated that the foregoing explanation of operation and gear states of the five speed transmission 500 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
    an input member;
    an output member;
    first, second and third planetary gear sets each having first, second and third members, wherein the input and output members are each interconnected to at least one of the first, second, and third planetary gear sets;
    a first interconnecting member continuously interconnecting the second member of the first planetary gear set with the third member of the second planetary gear set;
    a second interconnecting member continuously interconnecting the third member of the first planetary gear set with the third member of the third planetary gear set;
    a third interconnecting member continuously interconnecting the second member of the second planetary gear set with the second member of the third planetary gear set; and
    four torque transmitting mechanisms each selectively engageable to interconnect at least one of the first, second and third members of the first, second and third planetary gear sets with at least one other of the first, second, third members and a stationary member, wherein a first of the four torque transmitting mechanisms is selectively engageable to interconnect the first member of the first planetary gear set with the second member of the second planetary gear set and the second member of the third planetary gear set, and
    wherein the torque transmitting mechanisms are selectively engageable in combinations of at least two to establish at least five forward speed ratios and at least one reverse speed ratio between the input member and the output member.

2. The transmission of claim 1 wherein a second of the four torque transmitting mechanisms is selectively engageable to interconnect the input member and the first member of the second planetary gear set with the second member of the second planetary gear set and the second member of the third planetary gear set.

3. The transmission of claim 2 wherein a third of the four torque transmitting mechanisms is selectively engageable to interconnect the first member of the first planetary gear set with the stationary member.

4. The transmission of claim 3 wherein a fourth of the four torque transmitting mechanisms is selectively engageable to interconnect the third member of the first planetary gear set and the third member of the third planetary gear set with the stationary member.

5. The transmission of claim 1 wherein the third member of the first planetary gear set, the first member of the second planetary gear set and the third member of the third planetary gear set are sun gears, the second member of the first planetary gear set, the second member of the second planetary gear set, and the second member of the third planetary gear set are carrier members and the first member of the first planetary gear set, the third member of the second planetary gear set and the first member of the third planetary gear set are ring gears.

6. The transmission of claim 1 wherein two of the torque transmitting mechanisms are brakes for connecting a plurality of the first, second, and third members to the stationary member and two of the torque transmitting mechanisms are clutches for connecting at least one of the first, second, and third members of the first, second and third planetary gear sets to at least one other first, second and third members.

7. The transmission of claim 1 wherein the output member is continuously interconnected to the first member of the third planetary gear set.

8. The transmission of claim 1 wherein the input member is continuously interconnected to the first member of the second planetary gear set.

* * * * *